(12) United States Patent
Talwar (10) Patent No.: US 9,955,368 B2
(45) Date of Patent: Apr. 24, 2018

(54) TELECOMMUNICATON NETWORK ARCHITECTURE COMPATIBILITY VALIDATION SYSTEM

(71) Applicant: T-Mobile USA, Inc., Bellevue, WA (US)

(72) Inventor: Sandeep Talwar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/279,180

(22) Filed: Sep. 28, 2016

(65) Prior Publication Data

US 2017/0181012 A1 Jun. 22, 2017

Related U.S. Application Data

(60) Provisional application No. 62/268,057, filed on Dec. 16, 2015.

(51) Int. Cl.
*H04W 24/02* (2009.01)
*H04W 8/22* (2009.01)
*H04W 76/02* (2009.01)
*H04W 88/02* (2009.01)

(52) U.S. Cl.
CPC ............. *H04W 24/02* (2013.01); *H04W 8/22* (2013.01); *H04W 76/025* (2013.01); *H04W 88/02* (2013.01)

(58) Field of Classification Search
CPC ..... H04W 24/02; H04W 8/22; H04W 76/025; H04W 88/02; H04M 8/245

USPC ...................................................... 455/67.11
See application file for complete search history.

(56) References Cited

U.S. PATENT DOCUMENTS

| | | | | |
|---|---|---|---|---|
| 8,417,246 | B2* | 4/2013 | Olofsson ............... | H04W 24/08 455/436 |
| 8,467,987 | B1* | 6/2013 | Davidson .............. | H04W 24/06 455/408 |
| 2009/0124250 | A1* | 5/2009 | Topaltzas .............. | H04W 24/06 455/423 |
| 2011/0170517 | A1* | 7/2011 | Bakker ............ | H04W 36/0033 370/331 |
| 2012/0233605 | A1* | 9/2012 | Lupu ................... | G06F 11/0709 717/172 |
| 2012/0307697 | A1* | 12/2012 | Mukhopadhyay .... | H04W 4/001 370/311 |

(Continued)

*Primary Examiner* — Edward Urban
*Assistant Examiner* — Ralph H Justus
(74) *Attorney, Agent, or Firm* — Lee & Hayes, PLLC (57) ABSTRACT

Systems and processes may be implemented to revalidate carryover functionalities of a telecommunication device operating system (OS) with respect to updated telecommunication network architectures. Legacy test protocols may be generated based on an initial validation of a functionality prior to releasing an OS. Subsequently, the legacy test protocols may be executed for revalidation of the functionality when later carried over into a later version of the OS. The legacy test protocols may also be executed in response to telecommunication network hardware updates to validate existing functionalities with respect to new hardware components or technology. The later version of the OS may be analyzed to identify carryover functionalities and the identified carryover functionalities may ranked according to importance of being revalidated.

16 Claims, 5 Drawing Sheets

(56) References Cited

U.S. PATENT DOCUMENTS

| | | | |
|---|---|---|---|
| 2013/0189991 A1* | 7/2013 | Rose | H04W 16/18 455/436 |
| 2016/0073331 A1* | 3/2016 | Balakrishnan | H04W 4/02 455/456.1 |
| 2016/0373944 A1* | 12/2016 | Jain | H04L 43/50 |
| 2016/0374132 A1* | 12/2016 | Yerrabommanahalli | H04L 65/1006 |

* cited by examiner

TELECOMMUNICATON NETWORK ARCHITECTURE COMPATIBILITY VALIDATION SYSTEM

CROSS REFERENCE TO RELATED APPLICATION

This patent application claims the benefit of U.S. Provisional Patent Application Ser. No. 62/268,057 filed Dec. 16, 2015, entitled "TELECOMMUNICATION NETWORK ARCHITECTURE COMPATIBILITY VALIDATION SYSTEM", which is hereby incorporated in its entirety by reference.

BACKGROUND

Telecommunications network architectures are continuously updated as increasingly powerful and efficient technologies are developed. This cycle results in a need to continuously revalidate compatibility of mobile telecommunications devices with updated network architectures as new technologies are added thereto. This need for continuous revalidation extends to even generations old legacy mobile devices which must remain compatible with a carrier's network notwithstanding network architecture updates. Also, a typical operating system (OS) of a modern mobile telecommunication device undergoes continuous updates to increase or improve device functionalities. These updates to mobile device OSs are autonomously downloaded and installed practically every few weeks. However, as the rate at which mobile device updates increases, so does the potential for previously validated carryover (e.g. "legacy") functionalities to be inadvertently modified or damaged while the updates are being written.

Accordingly, it may be tedious or even impracticable for a typical telecommunications carrier to fully validate or revalidate each and every new telecommunication hardware technology as compatible with the ever increasing list of functionalities built into a typical mobile telecommunications device. This problem is exacerbated by the need to revalidate carryover functionalities which were validated on a previous OS version but require revalidation on an updated OS version.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes various systems and processes that may be implemented to revalidate carryover (e.g. "legacy") functionalities with an updated telecommunication network architecture. In particular, the systems and processes may record or otherwise observe an initial validation of a functionality that is built into an operating system (OS) and based thereon generate a legacy test protocol. The legacy test protocol may be used to revalidate the first functionality of the OS based on an additional type of telecommunication hardware technology being added to a telecommunication carrier's network. The legacy test protocol may also be used to validate a carryover functionality in a later version of the OS, e.g. when the first functionality is intended by developers to be carried over to the later version of the OS. For example, a first version of an OS may include a text message functionality and a second version of the OS may additionally include a camera functionality while retaining the text message functionality as a carryover or legacy functionality. Thus, the legacy test protocol may be used to validate the carryover text message functionality in the second version of the OS. These systems and processes, which are described further herein, can reduce the burden of revalidating carryover functionalities following each of the likely numerous OS updates that are pushed to mobile devices and also of validating forward and backward telecommunication network hardware compatibility of mobile devices based on updates to a carrier's network architecture. It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results.

Figure 1:
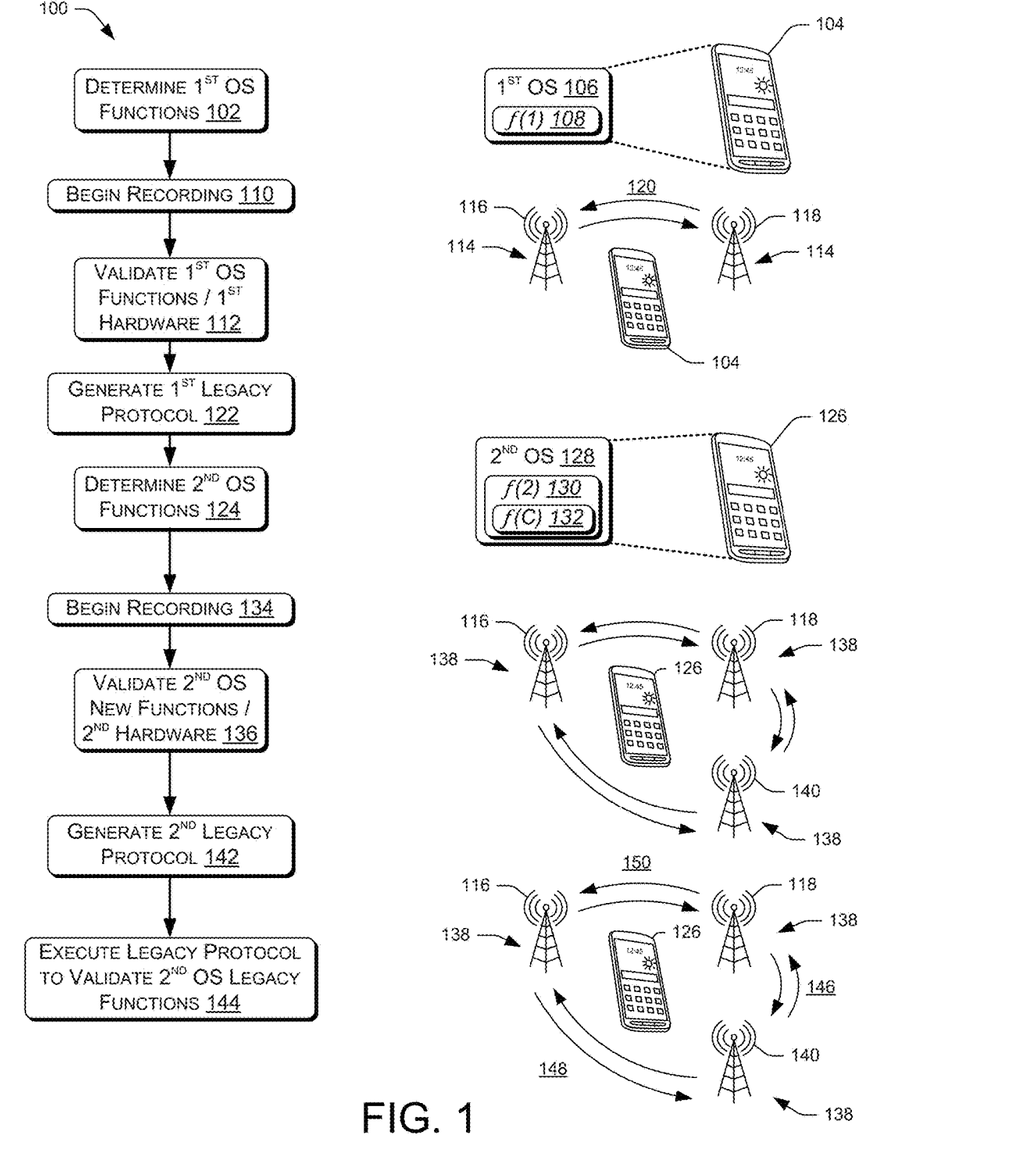
FIG. 1 is a pictorial flow diagram that shows an illustrative process of revalidating functionalities that are carried over from a first operating system (OS) to a second OS by observing a validation of the functionalities on the first OS to generate legacy test protocols for revalidation.

FIG. 1 is a pictorial flow diagram that shows an illustrative process 100 of revalidating functionalities that are carried over from a first operating system (OS) to a second OS by observing a validation of the functionalities on the first OS to generate legacy test protocols for revalidation. The order of the blocks below is not limiting, and thus the operations associated with the blocks below may be performed in a different order and/or some operations may be performed in parallel with other operations and/or some operations may be omitted.

At block 102, a first telecommunication device 104 that is running a first OS 106 may be analyzed to determine a first set of functionalities 108 of the first OS 106. The first set of functionalities 106 may include any type of function which may be performed by a telecommunication device such as, for example making and maintaining phone calls as the telecommunication device travels between "cells" of a telecommunication carrier's network. Functionalities may also include cross-dependencies such that a particular functionality, e.g. placing a call based on a voice command, depends on more than one functional component of the OS. For example, depending on the underlying source code, placing a call based on a voice command may require communication between a voice recognition functionality and each of a contacts list functionality and a basic phone functionality.

Therefore, in some implementations, determining the first set of functionalities 102 may include determining dependencies between functionalities, e.g. one-way dependencies or interdependencies between numerous functionalities of an OS.

In some embodiments, the first set of functionalities 108 may be determined by analyzing source code of the first OS 106 to identify and parse portions of the source code which correspond to individual ones of the first set of functionalities 108. For example, a human may identify of tag the first set of functionalities 108 during development of the first OS's 106 source code or by subsequent examination thereof. Alternatively, the first set of functionalities 108 may be determined independent of the source code or any examination thereof. For example, the first set of functionalities 108 may be provided by a user input or by communication with one or more project management platforms, e.g. a software platform including an "OS project wish list" and OS project deliverables information corresponding to the development of the first OS 106.

Furthermore, in some implementations, one or more machine learning algorithms may be provided with training data corresponding to particular types of functionalities which may be programmed into a telecommunication device OS. Such training data may include, for example, training data corresponding to sending and receiving wireless messages including, but not limited to, text, images, audio, and video. Training data may also include telecommunication standards such as, for example, standards protocols for utilizing Short Message Service (SMS) protocols or Multimedia Message Service (MMS) to transfer information between mobile devices. Training data may also include human identified source code classifications and corresponding functionalities, e.g. a developer may tag source code with functionality indications. Based on the training data, a machine learning algorithm may identify and parse individual ones of the first set of functionalities 108.

At block 110, a recording session may be commenced to create a record corresponding to a validation of the first set of functionalities 108 on the first telecommunication device 104. For example, a recording session may be commenced to create a validation recording of all inputs and outputs corresponding to telecommunication device 104. Such inputs may include one or more manual command inputs received through a user interface of the telecommunication device 104. A validation recording may also include data transfer requests and responses between the telecommunication device 104 and a telecommunication carrier's network. Furthermore, command inputs may be received by the first telecommunication device 104 (or any other telecommunication device discussed herein) via one or more external command sources such as an external computing platform that is in communication with the first telecommunication device 104.

At block 112, the first set of functionalities 108 of the first OS 106 may be validated using the first telecommunication device 104. In some implementations, a communication link may be established with a first telecommunication network 114 that includes at least a first radio frequency (RF) signal source 116 and a second RF signal source 118. In some implementations, the first RF signal source 116 and the second RF signal source 118 generate technologically similar radio access networks (RANs) for mobile communications by employing similar telecommunication hardware technologies (THTs). For example, the first RF signal source 116 and the second RF signal source may each generate a corresponding Long Term Evolution (LTE) RAN access zone.

In some instances, the first telecommunication network 114 may include numerous type of network components which may be provided by various companies. Thus, various components provided by different companies, or merely bearing a different part number, may undergo individualized validation notwithstanding using one or more already validated THTs. In some implementations, the first telecommunication network 114 may conform to one or more types of Universal Mobile Telecommunications System (UMTS) technologies, e.g. UMTS-time division duplexing (TTD) technologies or UNITS-frequency division duplexing (FDD) technologies. Furthermore, in some implementations, the first telecommunication network 114 may share components such as a Circuit Switched (CS) core network infrastructure and a Packet Switched (PS) core network infrastructure which employ one or more of a LTE RAN, a GSM EDGE RAN (GERAN), Global System for Mobile Communications (GSM), or any other type of telecommunication hardware technology (THT) whether currently existing or subsequently developed. It should be appreciated that THTs are not limited to RAN THTs but may also include core network infrastructure technologies. Thus, within the first telecommunication network 114, and any other telecommunication network described herein, numerous types of RAN THTs and core THTs may coexist to process telecommunication traffic during OS validation.

In some implementations, the first set of functionalities 108 is validated by performing, on the first telecommunication device 104, a first set of test protocols in which individual test protocols may correspond to individual functionalities of the first set 108. For example, an individual test protocol may correspond to generating or receiving a predetermined amount of phone traffic either manually or through deployment of a network traffic generator. One or more test protocols may also validate dependencies between different functionalities. For example, a test protocol may correspond to capturing a photograph through a camera of the first telecommunication device 104 and transferring the photograph along with text as a multimedia message, e.g. using a MMS, to a remote telecommunications device. Thus, such a test protocol may at least partially validate the basic multimedia message functionality of the first OS 106 while also validating a dependency of the multimedia message functionality such as calling on the first OS 106 to open the camera application via an prompt within the multimedia message functionality as opposed to opening the camera via a camera app icon of the first OS 106.

In some implementations, the validating at block 112 may also include validating a compatibility of the first telecommunication device 104 and/or the first OS 106 with one or more THTs. For example, the first OS 106 may include a functionality to facilitate handovers of the first telecommunication device 104 between RANs. For example, in real world operation a telecommunication device may be physically transported through cells of a carrier's network causing natural signal strength attenuation and/or amplification to occur as the device becomes further from one RF signal source and closer to another RF signal source. Although signal attenuation and signal strength amplification may in some contexts be used discretely, e.g. to describe weakening or strengthening of signal strength, as used herein signal attenuation refers to any increase or decrease in the strength of an RF signal. Thus, at block 112 a power level corresponding to one or more of the first RF signal source 116 and the second RF signal source 118 may be manipulated to cause a first handover 120 of the first telecommunication device 104 between RF signal sources 116 and 118. In some implementations, the first handover 120 is caused by performing one or more predetermined signal strength attenuation schedules. For example, power may be decreased on the first RF signal source 116 and increased on the second RF signal source 118 (or vice versa) during a performance of a particular functionality of the first OS 106 to validate that the handover 120 will occur without a disruption or causing a lag in service corresponding to the particular functionality.

Furthermore, in some implementations, validating at block 112 may include performing interoperability testing (TOT) to induce interactions between various components of a telecommunication network architecture. In particular, any particular telecommunication network architecture may include various types of different THTs as well as different components which employ the same THT but which are manufactured by different companies. Accordingly, it may be beneficial to induce communications and/or other interactions to occur between as many different components and during performance of as many different functionalities as possible while validating any given system. Therefore, in some implementations, the first set of test protocols may include one or more attenuation schedules for the RF signal sources, e.g. to induce handovers between RANs, and also one or core network infrastructure modifications to induce varying component interactions during the validation at block 112. For example, switching may be performed to toggle on or off various components of the network core to induce routing of various packets though hardware components which have not yet been validated with respect to a particular funtionality. Thus, discovery of a lack of interoperability between two or more components of the first telecommunication network 114 may be performed not only on a level component-to-component level but also at the finer level of component-to-component during functionalities.

At block 122, a first set of legacy test protocols may be generated based at least in part on the validation recording of block 110 corresponding to validation of the first set of functionalities 108 on the first telecommunication device 104. In some implementations, legacy test protocols are created by converting one or more input commands into a sequence of instructions corresponding to the one or more input commands. Although the sequence of instructions corresponds to the one or more input commands, the sequence of instructions need not match the one or more input commands identically. For example, the sequence of instructions may retain specific execution commands associated with the validation of functionalities but may omit, at least partially, one or more navigational commands which simply navigate through the user interface (UI) of the OS. For example, while the one or more input commands may have required multiple navigational commands to ultimately prompt the execution command, such navigational commands may be unnecessary when the ultimate execution command may be manually prompted. The one or more input commands may include but are not limited to physical user input through a keyboard or graphical user interface (GUI) of the first telecommunication device 104. For example, a human user may manually enter input commands to perform or validate a particular functionality and these input commands may be recorded and converted into a corresponding legacy test protocol.

As one specific but non-limiting example, suppose the first OS 106 includes a new functionality that has not been previously released and which allows a user to schedule a delayed time to send a multimedia message through a MIMS. Also, suppose that an expedited release of the first OS 106 is desirable. In such a case, it may be expedient to manually perform validation testing on the first telecommunication device 104 as opposed to taking the time to program a testing protocol. In particular, a human user may manually validate the new functionality by transcribing a message to be sent which may include each of a text sting and an image frame uploaded from a gallery of the phone. In doing so the human user may perform a series of navigational commands through a series of different screens used to complete the ultimate task of authoring the message and scheduling the delayed time to send it. For example, the human user may scroll through one or more home screens of the first telecommunication device 104 before a selectable MIMS application icon is displayed. Then, the human user may select the MIMS application icon and select a "compose new message" icon before being prompted to enter a recipient mobile number and compose a message. Finally, the human user may enter a recipient mobile number, transcribe the test "This is a test MMS" into the message field, browse through a photo gallery of the first OS 106 and select an image, and finally schedule a time to send the test message. It should be appreciated that performing all of the foregoing commands may ultimately result in an execution command such as, for example, "Send.MMS/Recipient.Number=555.555.5555; Text=This is a test MMS; Media=Galery.Photo#0001; Delay=Yes; Schedule.Transmission=18:45 11/23/2015." Accordingly, in some implementations a legacy protocol may retain the ultimate result of the human user input commands, e.g. one or more execution commands, while omitting one or more navigational commands. It may be beneficial for legacy test protocols to be retained based on execution commands as opposed to navigational commands, e.g. commands which enable a user to navigate through a user interface of an OS, because the legacy test protocols may then be less vulnerable to OS UI modifications motivated by aesthetics or user experience design as opposed to pure functionality. In particular, in the event that changes occur to the arrangement of icons or the required navigational commands required to perform the new functionality, the ultimate execution command may still prompt execution of the new functionality notwithstanding the navigational commands used to get there changing.

At block 124, a second telecommunication device 126 that is running a second OS 128 may be analyzed to determine a second set of functionalities 130 of the second OS 128. The second set of functionalities 130 may include any type of function which may be performed by a telecommunication device including but not limited to those of the first set of functionalities 108. Moreover, determining the second set of functionalities at block 124 may also include identifying one or more carryover functionalities 132, e.g. one or more functionalities that are carried over to the second OS 128 from the first set 108 of the first OS 106. For example, the second OS 128 may retain the previously new function which allows a user to schedule a delayed time to send a message through a MMS. It should be appreciated that the second set of functionalities 128, and any carryover functionalities thereof, may be determined in a similar manner to how the first set of functionalities 108 was determined.

At block 134, a recording session may be commenced to create a record corresponding to a validation of at least some of the second set of functionalities 130 on the second telecommunication device 126. For example, a recording session may be commenced to create a validation recording of all inputs and outputs corresponding to telecommunication device 126 during validation of some of the second set of functionalities 130. Such inputs and outputs may include, but are not limited to, those described in relation to blocks 112 and 122.

At block 136, one or more new functionalities of the second OS 128 may be validated using the second telecommunication device 126. In some implementations, a communication link may be established with the first telecommunication network 114 that includes at least the first radio frequency (RF) signal source 116 and the second RF signal source 118. In other implementations, a communication link may be established with a second telecommunication network 138 which may include some components of the first telecommunication network 114 and one or more additional components. For example, the second telecommunication network 138 may include the first and second RF signal sources 116, 118 in addition to at least a third RF signal source 140. In some implementation, the third RF signal source 140 is added as a technological update to network 114 to create network 138, e.g. the network 114 may be modernized with additional RAN and/or core THTs. Furthermore, the second telecommunication network 138 may include any characteristics described herein with relation to the first telecommunication network 114, e.g. technologically similar or dissimilar THTs and/or network components provided by various companies.

The second set of functionalities 130 may be validated by performing, on the second telecommunication device 126, a second set of test protocols in which individual test protocols may correspond to individual new functionalities of the second OS 128, e.g. those functionalities included in the second set 130 but not within the first set 108. It should be appreciated that the description associated with block 112 is equally applicable to block 136. For example, at block 136 a power level corresponding to one or more of the first, second, or third RF signal sources 116, 118, 140 may be manipulated to cause handovers 120 of the second telecommunication device 126 between RF signal sources.

At block 142, a second set of legacy test protocols may be generated based at least in part on the validation recording of block 134 corresponding to validation of some of the second set of functionalities 130 on the second telecommunication device 126. In some implementations, legacy test protocols are created by converting one or more input commands into a sequence of instructions corresponding to the one or more input commands. It should be appreciated that the description associated with block 122 is equally applicable to block 142.

At block 144, the first set of legacy test protocols that were generated at block 122 may be executed to validate the carryover functionalities 132 that were identified at block 124. Generally, the carryover functionalities 132 are at least partial duplicates of one or more of the individual functionalities of the first set 108. Accordingly, it should be appreciated that in some implementations one or more execution commands may at least partially retain their functionality in the second OS 128. For example, in the second OS 128 the foregoing execution command, i.e. "Send.MMS/Recipient. Number=555.555.5555; Text=This is a test MMS; Media=Galery.Photo#0001; Delay=Yes; Schedule.Transmission=18:45 11/23/2015," may prompt the second OS 128 to perform a similar function as it did in the first OS 106. Furthermore, based at least on the "Schedule.Transmission" field of the foregoing command it should be appreciated that the legacy test protocols may require dynamic modification during execution at block 144. For example, during the validation of the first OS at block 112 the scheduled transmission time of "18:45 11/23/2015" may have represented a future point in time such that scheduled transmission time was delayed whereas during the subsequent execution of the legacy protocols at block 144 the time and date will likely be after the previous scheduled transmission time rendering such a transmission impossible. In other words, it is not possible to schedule a MIMS to be sent in the past. Accordingly, generating legacy protocols may include generating one or more logical rules to be performed during the executing at block 144. For example, a logical rule may be created to determine an appropriate scheduled transmission time, e.g. 45 seconds from a current time during execution at block 144.

In some implementations, executing the legacy test protocols at block 144 includes manipulating a power level corresponding to one or more of the second RF signal source 118 and the third RF signal source 118 to cause a handover 146 of the second telecommunication device 126 between RF signal sources 118 and 140. In some implementations, the handover 146 is caused by performing one or more predetermined signal strength attenuation schedules similar to those described in relation to block 112. In some implementations, executing the legacy test protocols includes causing multiple handovers between numerous RF signal sources which do not correspond to any handovers at block 112. For example, the executing the legacy test protocols may further include causing a handover 148 between the first RF signal source 116 and the third RF signal source 140. It should be appreciated that at either of blocks 142 or 144, a determination may be made as to each potential handoff path to ensure complete interoperability between all components, e.g. all RAN and core THTs and the device 126. Thus, in the illustrated implementation, a handover 150 may also be induced for the second telecommunication device 126 between RF signal sources 116 and 118.

Figure 2:
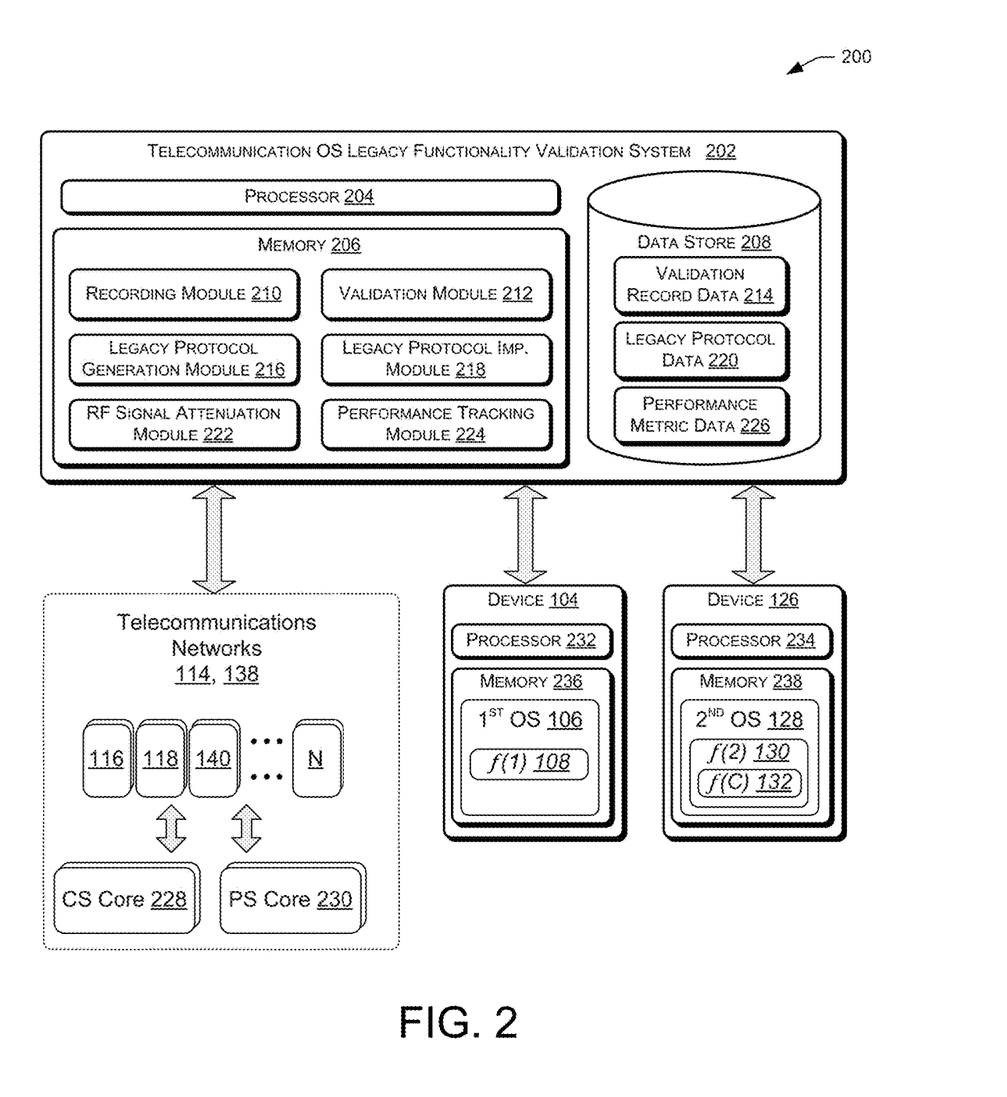
FIG. 2 illustrates components of a system to revalidate legacy functionalities of telecommunication device operating systems and interoperability between hardware components of a telecommunication network.

FIG. 2 illustrates an illustrative environment 200 that includes components of a system to validate legacy functionalities of telecommunication device operating systems (OSs) and interoperability between hardware components of a telecommunication network. The environment 200 includes a telecommunication OS legacy functionality validation system 202 that includes one or more processors indicated by the processor 204 and also memory 206 that is accessible by the processor 204. The memory 206 is an example of computer readable storage media and may include volatile memory, nonvolatile memory, removable memory, non-removable memory, or a combination thereof. For example, the memory 206 may include, but is not limited to, RAM, ROM, EEPROM, flash memory, one or more hard disks, solid state drives, optical memory (e.g. CD, DVD), or other non-transitory memory technologies. The memory 206 may store a number of modules including computer-readable instructions executable by the processor 204 to validate functionalities 108 and 128 of devices 104 and 126. The telecommunication OS legacy functionality validation system 202 may also include or otherwise be coupled to a data store 208 that may include a number of mass storage devices, such as a redundant array of independent disks (RAID).

The memory 206 includes a recording module 210 and a validation module 212. The validation module 212 is executable by the processor 204 perform testing protocols to validate functionalities of a telecommunication device OS.

For example, the validation module 212 may perform preloaded testing protocols to validate the first set of functionalities 108 of the first OS 106. In some implementations, such preloaded testing protocols may be pre-programmed protocols, e.g. programed prior to their performance, uploaded to the data store 208, or otherwise provided to the validation module 212. In some implementations, performing testing protocols on a device may include human interaction with the device such as, for example, manual human operation of the device during which the validation module 212 observes inputs and outputs corresponding to the human interaction. Such manual human operation may be either direct, e.g. through physical contact with the device, or indirect, e.g. through remote control of the device. The recording module 210 is executable by the processor 204 to commence a recording session prior to any given testing protocols being performed in order to create a record of at least some command inputs associated with the testing protocols and to provide the record to the data store 208 as validation record data 214.

The memory 206 includes a legacy protocol generation module 216 and a legacy protocol implementation module 218. The legacy protocol generation module 216 is executable by the processor 204 to generate or be operated to generate legacy test protocols based at least partially on the validation record data 214. For example, the legacy protocol generation module 216 may be configured to analyze the validation record data 214, which may include some or all of the commands input, and results thereof, while using the validation module 212 to generate a sequence of instructions that correspond to the input commands. Such a sequence of instructions may be a distilled or refined version of the input commands. For example, a particular series of command inputs may include a large number of navigational commands which were used to navigate through the user interface (UI), e.g. the layer of an OS which is displayed on a graphical user interface (GUI) to bring structure to user interactions with the OS, in order to ultimately generate executional commands. In some implementations, the legacy protocol generation module 216 provides a graphical display, via a GUI, of at least some of the sequence of instructions and receives user input corresponding to the display. For example, the sequence of instructions may be displayed along with suggestions to accept, edit, or provide additional input such as one or more logical rules to supplement the sequence of instructions for use in a legacy test protocol.

In some implementations, the legacy protocol generation module 216 is configured to determine various THTs included in a telecommunications network and, based thereon, to further supplement generated legacy test protocols with one or more additional instructions associated with validating the various THTs in conjunction with one or more functionalities, e.g. the second set 130 and/or the carryover functionalities 132. For example, a sequence of instructions which were used to validate a particular functionality may be displayed via a GUI along with a suggested THT cycle to validate the particular functionality on each of the identified THTs. Continuing with the previous example, i.e. validating a scheduled delay MMS functionality, a sequence of instructions may be displayed which correspond to command inputs from an initial validation of the functionality. The displayed sequence may include all command inputs including both execution commands as well as navigational commands. In some implementations, the legacy protocol generation module 216 may lead a user through development of the legacy test protocols by displaying one or more questions or suggestions to assist in generating the legacy test protocols. For example, in an implementation which the UI of the OS has not undergone any intentional changes, e.g. there are no intended changes to navigational commands required to generate execution commands, the legacy protocol generation module 216 may suggest generating a legacy test protocol which cycles through the navigational commands at least one time to ensure that no inadvertent OS or UI modifications have occurred. However, performing the navigational steps initially done to ultimately generate an execution command may be more time consuming than necessary when validating the particular functionality for interoperability across multiple THTs. In particular, because navigational commands may be independent of a particular THT that a telecommunication device is in communication with, e.g. a user interaction with a UI is no different when sending a multimedia message using a MMS over an LTE network vs doing the same over a GERAN network, then performing them with each THT may be superfluous. Therefore, the legacy protocol generation module 216 may generate, or suggest generation of, a legacy test protocol which cycles through navigational commands of the second OS 128 a single time with respect to a first THT while omitting navigational commands, e.g. using only the execution commands, with respect to the remaining THTs of a particular network.

Upon generation of one or more legacy test protocols, the legacy protocol generation module 216 is configured provide the generated legacy test protocols to the data store 208 as legacy protocol data 220.

The legacy protocol implementation module 218 is executable by the processor 204 to retrieve legacy protocol data 220 and to implement or be operated to implement the legacy test protocols. In some implementations, the legacy protocol implementation module 218 is configured to identify changes to a network architecture having occurred since the generation of legacy test protocols or since initial validation of a previous OS version. For example, it may be determined that a particular legacy test protocol does not test one or more individual functionalities of the second OS with respect to one or more THTs or one or more particular vendor provided components implementing an otherwise tested THT. In particular, suppose a set of legacy test protocols have been generate corresponding to a telecommunication network architecture which includes a first THT and a second THT but not a third THT. Further suppose that the third THT is added to the architecture. In some implementations, the legacy protocol implementation module 218 is configured to identify such changes and to modify the legacy test protocol to further test the third THT with respect to one or more functionalities. In some implementations, the legacy protocol implementation module 218 is configured to communicate with a RF signal attenuation module 222 to execute radio frequency (RF) signal strength attenuation to cause handovers of a telecommunication device being used during validation and a plurality of RF signal sources which may correspond to different THTs, e.g. different RAN and/or core THTs.

The memory 206 further includes a performance tracking module 224 to track a performance of telecommunications devices and telecommunications networks during validation of individual functionalities and revalidation of corresponding carryover functionalities. Data corresponding to tracked performances is provided to the data store 208 as performance metric data 226. In some implementations, the performance metric data 226 includes information associated with desired end results of one or more legacy test protocols to be used for comparison against one or more actual results of the legacy test protocol(s). For example, the performance tracking module 224 may determine whether a performance of a carryover functionality satisfies, e.g. meets or exceeds, one or more passing criteria. Such passing criteria may correspond to a result achieved during initial validation of the carryover functionality, e.g. in a previous version of an OS in which the functionality was not yet "carryover." Such passing criteria may also be user or developer defined criteria provided as performance metric data 226. In some implementations, individual functionalities of an OS undergoing validation are assigned passing or failing grades based on their performance in order to flag particular functionalities, e.g. those with failing grades, which developers will likely need to dedicate time and resources to for improvement thereof.

As shown in environment 200, the telecommunication OS legacy functionality validation system 202 may be in communication with telecommunications networks 114 and 138 and any other networks used for during validation as well as telecommunication devices 104 and 126. As illustrated, telecommunications networks 114 and 138 may include RF signal sources 116, 118, and 140 as described in relation to FIG. 1 as well as any other RF signal sources or RAN component as indicated by the ellipses to component N. The networks may also include one or both of a Circuit Switched (CS) core network infrastructure 228 or a Packet Switched (PS) core network infrastructure 230. Furthermore, it should be appreciated that each of telecommunications devices 104 and 126 may include a respective processor 232, 234 and memory 236, 238 storing a corresponding OS and associated functionalities as executable source code.

Figure 3:
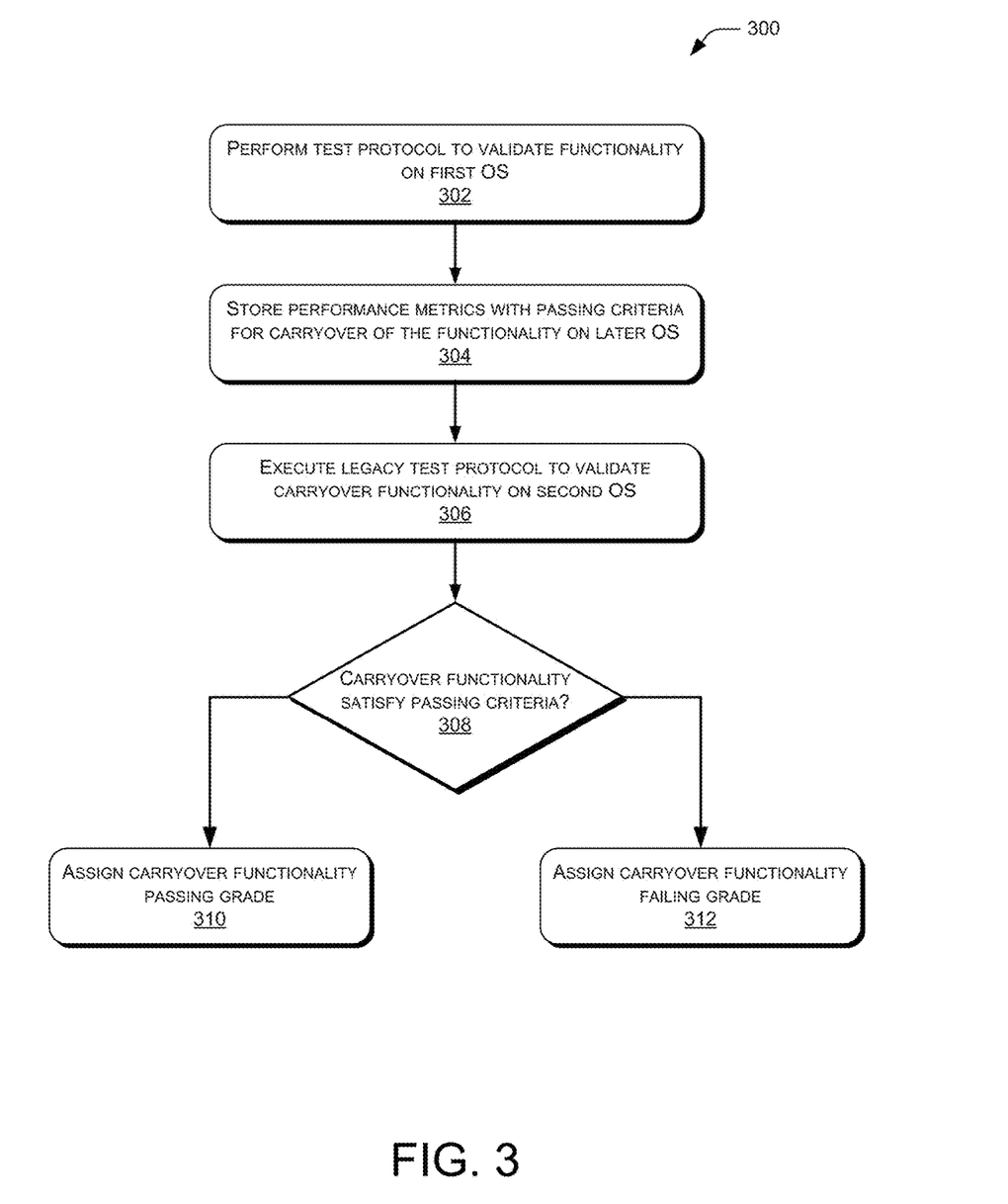
FIG. 3 is a flow diagram of an illustrative process to determine whether a carryover functionality adequately retains its intended utility from a previous version of an OS.

FIG. 3 is a flow diagram of an illustrative process to determine whether a carryover functionality adequately retains its intended utility from a previous version of an OS. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure, in addition to process 300, shall be interpreted accordingly.

At block 302, the validation module 212 may perform or be operated by a user to perform a test protocol to validate a functionality of a first OS. For example, the first OS may include a new functionality, e.g. the delayed MIMS functionality described above, and a user may validate the new functionality by manually performing one or more testing protocols by actually performing the new functionality and observing the results or by programming a testing protocol to be executed by the validation module 212 with little or no user input.

At block 304, performance metric data 226 may be stored by the performance tracking module 224 or the validation module 212. The performance metric data 226 may include passing criteria corresponding to revalidating the functionality at a later time as a carryover functionality on a later OS version. For example, a second OS may be created by updating a first OS with one or more new functionalities, programing one or more general updates such as programming bug fixes, or by refreshing the UI to give a modernized feel to previously existing functionalities. The performance metric data 226 may include an indication of an initial approval of one or more initial results of performing and validating the functionality on the first OS. Accordingly, the one or more initial results may be later used as benchmark for validation of functionality when carried over to a later version of the OS, e.g. the second OS.

At block 306, a legacy test protocol may be executed by the legacy protocol implementation module 218 in order to revalidate the functionality with respect to a second OS to which the functionality has been retained as a carryover functionality. In some implementations, the carryover functionality is validated with respect to a plurality of different THTs which were not included within a telecommunication network used to initially validate the functionality. For example, a newly introduced technology may have result in unforeseen complications and compatibility issues with regard to only some of the numerous functionalities that an OS may be configured to perform. In some implementations, the carryover functionality may be revalidated with respect to previously tested THTs. For example, based on increased functionality of a newly introduced technology a functionality may be carried over in part while modified to incorporate some benefits of the new technology. As a particular example, a text messaging functionality of a first OS may be initially designed to utilize Short Messaging Service (SMS) technology whereas a carryover functionality based thereon may be partially updated to utilize MIMS technology. Thus, it may be determined at block 306 that the carryover functionality works as intended with both SMS and MMS when sending or receiving text only but that the functionality fails on MIMS if a message includes any media, e.g. picture or video.

At block 308, a determination may be made as to whether the carryover functionality satisfies the passing criteria set forth in the performance metric data 226. For example, passing criteria may require transmitting a series of messages including a variety of content types, e.g. text and image, and transmitting the same with a specified degree of precision and timeliness using a plurality of different RAN or core THTs. In the event that the passing criteria is satisfied, then at block 310 a passing grade may be assigned to the carryover functionality. For example, it may be determined at block 308 that the carryover functionality of the second OS is able to transmit a message including text and an image of a particular resolution over an LIE network using MIMS technology within the prescribed timeliness but transmits only the text of the message, i.e. not the image, over an EDGE network using SMS technology. It may further be determined that neither the transmitting device nor the receiving device receives any indication that the image transmission failed. Accordingly, at block 310 the carryover functionality may be assigned a passing grade with respect to the LTE network while also being assigned at block 312 a failing grade with respect to the EDGE network. The assignment of failing grades may serve as a flag to notify developers of identified issues.

Figure 4:
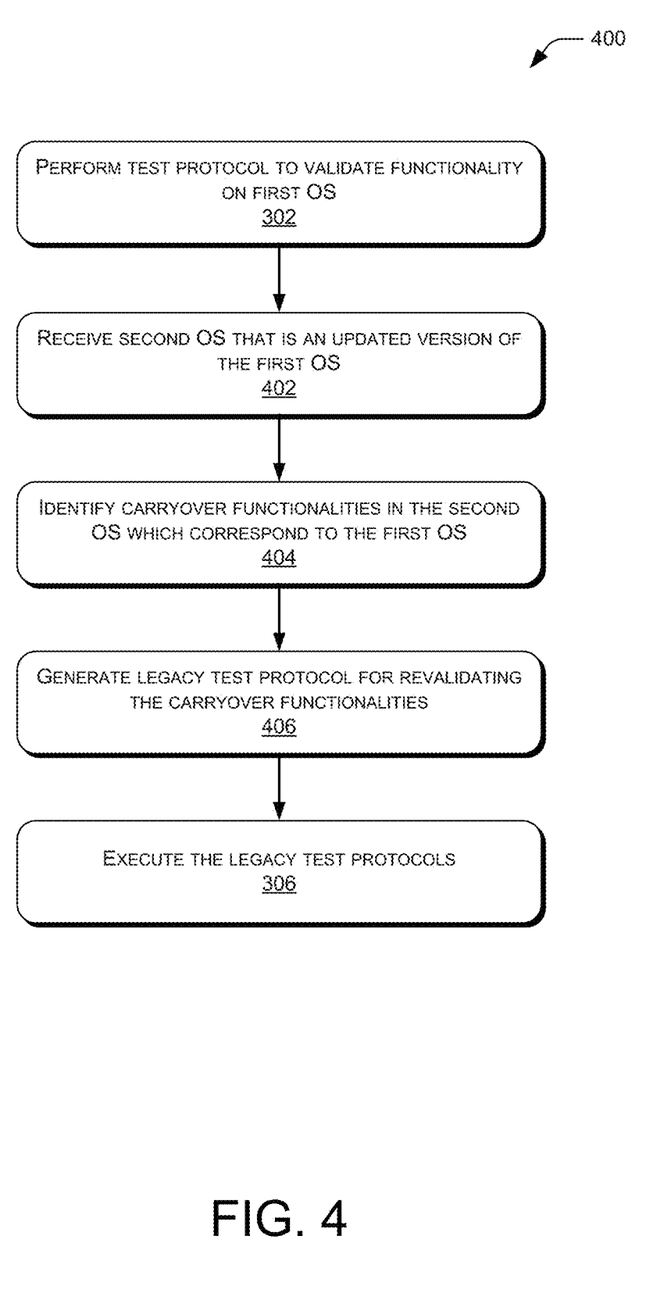
FIG. 4 is a flow diagram of an illustrative process 400 to identify carryover functionalities within a later version of an OS and to revalidate the identified carryover functionalities.

FIG. 4 is a flow diagram of an illustrative process 400 to identify carryover functionalities within a later version of an operating system (OS) and to revalidate the identified carryover functionalities.

At block 302, the validation module 212 may perform or be operated by a user to perform a test protocol to validate a functionality of a first OS as described above.

At block 402, a second OS 128 may be received which is an updated version the first OS 106. For example, following a release of the first OS a vendor may build upon the first OS as a platform for development of the second OS. The second OS may include additional functionalities, carryover functionalities which are at least partial duplicates of one or more functionalities of the first OS, updates to a UI, or any combination thereof.

At block 404, the legacy protocol generation module 216 may identify carryover functionalities within the second OS. In some implementations, individual functionalities of the first OS may be identifiable by one or more labels such as an execution command name. Such a label may be carried over to the second OS for a variety of reasons, e.g. as maintaining dependencies between various functionalities. In some implementations, the legacy protocol generation module 216 is configured to determine a similar or score between portions of source code of the second OS and portions of source code of the first OS. Furthermore, in some implementations, a plurality of suspected carryover functionalities are displayed on a GUI for examination by a user to confirm or deny that the suspected carryover functionalities do in fact correspond to a previously validated functionality.

At block 406, the legacy protocol generation module 216 may generate legacy test protocols for revalidating the carryover functionalities as described above. For example, a sequence of instructions may be generated for each of the identified carryover functionalities based on an analysis of the validation record data 214 provided corresponding to the initial validation the carryover functionality as coded in the first OS, e.g. before the functionality was "carryover."

At block 306, the legacy test protocols may be executed on a telecommunication device running the second OS. As described above, the telecommunications device may be connected to a telecommunications network that has been updated with one or more new RAN or core THTs since the first OS was validated.

Figure 5:
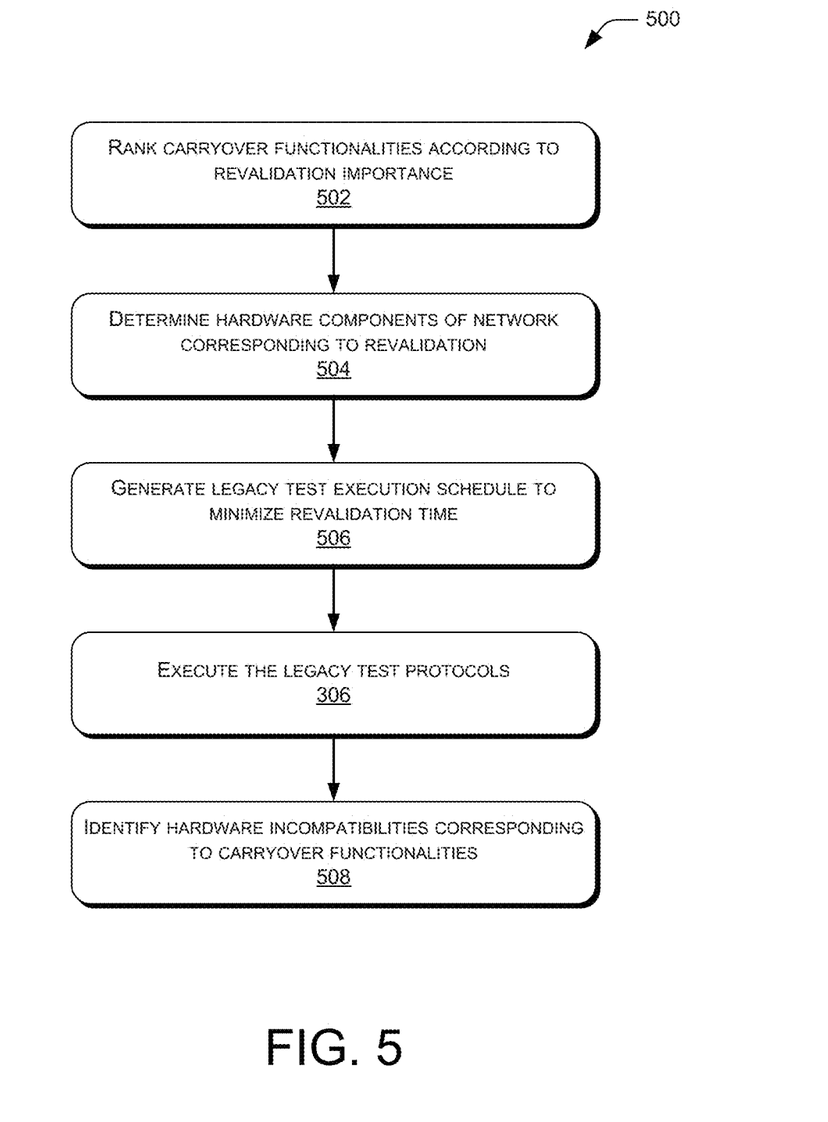
FIG. 5 is a flow diagram of an illustrative process 500 to minimize a duration of time needed for revalidating the carryover functionalities within a later version of an OS and to identify hardware incompatibilities corresponding to the same.

FIG. 5 is a flow diagram of an illustrative process 500 to minimize a duration of time needed for revalidating the carryover functionalities within a later version of an OS and to identify hardware incompatibilities corresponding to the same.

At block 502, the legacy protocol implementation module 218 may rank the carryover functionalities, e.g. those identified at block 404, according to an importance or criticality of their undergoing revalidation. For example, a risk management algorithm may be used to assign a rank to each individual carryover functionality corresponding to an estimated probability that one or more errors will occur, e.g. source code errors or hardware incompatibility errors. In some implementations, such a probability may be estimated based on a degree of code duplication of the carryover functionality. In particular, if the carryover functionality has been previously validated with respect to the first OS and the underlying source code has been duplicated as a mirror image then, all other things being equal, the probability of an error occurring may be very low. Accordingly, the carryover functionality may be assigned a low revalidation priority. Therefore, testing resources of a telecommunications carrier, which are in all likelihood both limited and costly, may be dedicated to revalidating other carryover functionalities which have a higher estimated error probability. Furthermore, in some implementations, the risk management algorithm may further base assigned ranking on an estimated impact corresponding to individual carryover functionalities. For example, if a failure mode of a particular functionality would likely result in a large negative impact then a relatively higher ranking may be assigned. For example, a failure mode corresponding to a core operation of an OS such as placing a phone call may result in a very large negative impact, e.g. consumers being unable to reach emergency services and an erosion of a client base due to dissatisfaction. Accordingly, in some implementations, core or otherwise highly important functionalities may be assigned a high ranking regardless of a corresponding higher estimated error probability.

In some implementations, the ranking of the carryover functionalities may be based on dependencies to other carryover functionalities. For example, a carryover text message functionality may depend on proper functioning of a variety of other carryover functionalities. For example, the text messaging carryover functionality may be intended to communicate with both of a contacts list and a camera driver of the corresponding OS. Therefore, changes to either one of the contacts list functionality or the camera driver functionality may inadvertently affect the carryover text message functionality. Accordingly, in some implementations, a relatively high degree of dependence of a particular carryover functionality on other carryover functionalities (or new functionalities for that matter) may result in a relatively high revalidation priority ranking. In contrast, highly independent carryover functionalities may receive relatively lower revalidation priority rankings.

At block 504, the legacy protocol implementation module 218 may identify the hardware components included within a network to be used for revalidation, e.g. network 138. For example, each of the RF signal sources 116, 118, and 140 may be identified and listed. It should be appreciated that a typical telecommunication network includes numerous different RAN and core hardware components and that such items may be produced by different vendors. In some implementations, rankings may further be based on telecommunication network architecture updates. For example, the legacy protocol implementation module 218 may identify updates to the revalidation network, e.g. network 138, as compared to the initial validation network, e.g. network 114.

At block 506, the legacy protocol implementation module 218 may generate a legacy test execution schedule with the intended goal of minimizing the time required to revalidate the carryover functionalities. For example, a schedule may be generated to maximize throughput of one or more telecommunication hardware components identified at block 504. For example, hardware components may have known throughput abilities based on multiplexing methods utilized by those hardware components. Accordingly, a legacy test execution schedule may be generated to achieve the highest throughput possible for each component during revalidation without overburdening the components. Furthermore, in some implementations, more than one telecommunication device may run the second OS for revalidation in parallel. For example, telecommunication device 126 may comprise 100 separate telecommunication devices which may be validating various carryover functionalities in parallel. Such an implementation may be preferable because a typical telecommunications network may be capable of handling traffic from numerous devices concurrently and, therefore, if one a single telecommunications device were used for revalidation the network system resources may be grossly underutilized despite the telecommunications device operating at processing capacity.

At block 306, the legacy test protocols may be executed on a telecommunication device running the second OS.

At block 508, the legacy protocol implementation module 218 may identify incompatibilities corresponding to particular hardware components ability to facilitate particular carryover functionalities. For example, it may be determined a particular hardware component based on SMS THT is unable to facilitate a streaming video call between telecommunication devices.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunication network architecture compatibility validation system, comprising:
one or more processors; and
one or more non-transitory computer readable media storing instructions that are executable by the one or more processors to perform operations comprising:
establishing, by a first telecommunication device configured to perform a first functionality, a first communication link with a first telecommunication network that includes at least a first telecommunication hardware technology (THT) and a second THT;
performing, on the first telecommunication device, a first test protocol to validate compatibility of the first functionality with each of the first THT and the second THT;
subsequent to the performing the first test protocol:
establishing, by a second telecommunication device configured to perform a second functionality and the first functionality, a second communication link with a second telecommunication network that includes at least the second THT and a third THT;
performing, on the second telecommunication device, a second test protocol to validate compatibility of the second functionality with each of the second THT and the third THT; and
executing, on the second telecommunication device and by a legacy protocol implementation module, a legacy test protocol to validate compatibility of the first functionality with each of the second THT and the third THT;
storing performance metrics, corresponding to the legacy test protocol, that include at least passing criteria associated with compatibility of the first functionality with one or more THTs; and
determining whether a performance of the first functionality, by the second telecommunication device based on the executing, meets or exceeds the passing criteria with respect to each of the second THT and the third THT; and
in response to determining that the performance meets or exceeds the passing criteria, assigning the second telecommunication device a passing grade with respect to the first functionality; or
in response to determining that the performance fails to meet the passing criteria, assigning the second telecommunication device a failing grade with respect to the first functionality.

2. The system of claim 1, wherein the performing the first test protocol includes receiving command inputs through a user interface corresponding to the first telecommunication device, wherein a legacy protocol generation module is configured to generate the legacy test protocol based on the command inputs.

3. The system of claim 2, the operations further comprising:
prior to the performing the first test protocol, commencing a recording session to create a record of at least some of the command inputs; and
providing the record of the at least some of the command inputs to the legacy protocol generation module, wherein the legacy protocol generation module generates the legacy test protocol as a sequence of instructions corresponding to the input commands.

4. The system of claim 1, wherein the performing the first test protocol causes a first handover of the first telecommunication device between the first THT and the second THT, and wherein the executing the legacy test protocol causes a second handover of the second telecommunication device between the second THT and the third THT.

5. The system of claim 4, wherein the executing the legacy test protocol further causes:
a third handover of the second telecommunication device between the first THT and the second THT; and
a fourth handover of the second telecommunication device between the first THT and the third THT.

6. The system of claim 4, the operations further comprising:
performing, during the legacy test protocol, radio frequency (RF) signal strength attenuation for one or more of the first THT, the second THT, or the third THT, wherein the second handover is caused by the RF signal strength attenuation.

7. A telecommunication operating system legacy functionality validation system, comprising:
one or more processors; and
one or more non-transitory computer readable media storing instructions that are executable by the one or more processors to perform operations comprising:
establishing, with a telecommunication device running a first operating system (OS), a first communication link corresponding to at least one of a circuit switched (CS) core or a packet switched (PS) core;
determining a first set of functionalities corresponding to the first OS;
performing, on the telecommunication device running the first OS, a plurality of test protocols to validate the first set of functionalities with respect to the at least one of the CS core or the PS core, wherein individual test protocols of the plurality of test protocols correspond to individual functionalities of the first set of functionalities;
based at least partially on the first OS being updated with one or more new functionalities to generate a second OS, establishing a second communication link between a telecommunication device running the second OS and a legacy protocol implementation module that is operable to:
identify carryover functionalities from a second set of functionalities corresponding to the second OS, the carryover functionalities being at least partial duplicates of one or more of the individual functionalities of the first set;
generate, based at least partially on the plurality of test protocols, a set of legacy test protocols for revalidation of the carryover functionalities; and
execute the set of legacy test protocols to revalidate the carryover functionalities,
record, during the performing, one or more manual command inputs corresponding to the individual test protocols as a validation recording, the one or more manual command inputs being received through a user interface corresponding to the telecommunication device running the first OS, and the set of legacy test protocols being generated based on the validation recording;

compare a performance of the telecommunication device running the second OS to performance metric data, the performance being in response to an execution of the set of legacy test protocols; and flag individual legacy test protocols of the set of legacy test protocols based on the performance.

8. The system of claim 7, wherein the legacy protocol implementation module is further operable to rank the carryover functionalities according to revalidation importance for particular ones of the carryover functionalities, the revalidation importance being based on at least one of a telecommunication network architecture update or a degree of code duplication corresponding to the particular ones of the carryover functionalities.

9. The system of claim 7, wherein the legacy protocol implementation module is further operable to:

determine hardware components corresponding to a telecommunication network architecture used in the establishing the second communication link; and generate a legacy test execution schedule to minimize an aggregate revalidation time of the carryover functionalities, the legacy test execution schedule to minimize conflicts, between the set of legacy test protocols, corresponding to the hardware components.

10. The system of claim 7, wherein the telecommunication device running the second OS is a later model than the telecommunication device running the first OS.

11. The system of claim 7, wherein the legacy protocol implementation module is further operable to identify a telecommunication hardware technology, from a telecommunication network architecture used in the establishing the second communication link, which is at least partially incompatible with one or more of the carryover functionalities.

12. The system of claim 7, wherein the legacy protocol implementation module is further operable to record and store performance metrics corresponding to execution of the set of legacy test protocols during revalidation of the carryover functionalities.

13. A telecommunication operating system legacy functionality validation system, comprising:

one or more processors; and one or more non-transitory computer readable media storing instructions that are executable by the one or more processors to perform operations comprising:

recording a plurality of test protocols being performed, on a telecommunication device running a first operating system (OS), to validate a first set of functionalities of the first OS;

generating a set of legacy test protocols based on the recording of the plurality of test protocols;

identifying one or more carryover functionalities of a second OS that is an updated version of the first OS;

executing, on a telecommunication device running the second OS, the set of legacy test protocols to revalidate the one or more carryover functionalities;

determining for individual ones of the one or more carryover functionalities whether a result of the executing matches one or more acceptable results as indicated in performance metric data;

determining whether a first carryover functionality, of the one or more carryover functionalities, is independent from other carryover functionalities of the one or more carryover functionalities;

determining whether a portion of source code corresponding to the first carryover functionality has been modified; and based on determining that the portion of source code has not been modified and that the first carryover functionality is independent the other carryover functionalities, deprioritizing revalidation of the first carryover functional component.

14. The system of claim 13, wherein the plurality of test protocols are performed manually, during the recording, through a user interface of the telecommunication device running the first OS.

15. The system of claim 13, wherein the plurality of test protocols include radio frequency (RF) signal strength attenuation schedules which cause a handover of the telecommunication device running the first OS from a first RF signal source to a second RF signal source during the recording, and wherein the legacy test protocols include one or more RF signal strength attenuation schedules.

16. The system of claim 13, the operations further comprising causing, during the executing the set of legacy test protocols, a failure of a first telecommunication hardware component with which the telecommunication device running the second OS is communicating with, wherein the determining includes determining whether the telecommunication device running the second OS establishes a communication link with a second telecommunication hardware component in response to the failure.

* * * * *